(12) United States Patent
Ting et al.

(10) Patent No.: US 12,061,388 B2
(45) Date of Patent: Aug. 13, 2024

(54) INTEGRATED STEREOSCOPIC IMAGE DISPLAY DEVICE

(71) Applicant: Lixel Inc., Taipei (TW)

(72) Inventors: Chih-Hung Ting, New Taipei (TW);
Wei-An Chen, Hsinchu County (TW);
Hsin-You Hou, New Taipei (TW);
Chih-Wei Shih, Hsinchu (TW);
Kuan-Yu Chen, Taichung (TW)

(73) Assignee: LIXEL INC., Taipei (TW)

( * ) Notice: Subject to any disclaimer, the term of this patent is extended or adjusted under 35 U.S.C. 154(b) by 0 days.

(21) Appl. No.: 17/952,527

(22) Filed: Sep. 26, 2022

(65) Prior Publication Data
US 2023/0359063 A1 Nov. 9, 2023

(30) Foreign Application Priority Data

May 3, 2022 (TW) .................... 111116598

(51) Int. Cl.
| | | |
|---|---|---|
| *G02F 1/1335* | (2006.01) | |
| *G02B 30/22* | (2020.01) | |
| *G02B 30/27* | (2020.01) | |
| *G02B 3/00* | (2006.01) | |
| *G02B 5/00* | (2006.01) | |
| *G02B 30/33* | (2020.01) | |

(52) U.S. Cl.
CPC ....... *G02F 1/133526* (2013.01); *G02B 30/22* (2020.01); *G02B 30/27* (2020.01); *G02B 3/0056* (2013.01); *G02B 5/005* (2013.01); *G02B 30/33* (2020.01)

(58) Field of Classification Search
CPC .... G02F 1/133526; G02B 30/22; G02B 30/27
See application file for complete search history.

(56) References Cited

U.S. PATENT DOCUMENTS

| | | | | |
|---|---|---|---|---|
| 2016/0091726 A1* | 3/2016 | Yoon | ................. | G02F 1/133377 349/86 |
| 2018/0107011 A1* | 4/2018 | Lu | ........................ | G09G 3/003 |
| 2021/0318552 A1* | 10/2021 | Yang | ..................... | G02B 30/32 |

FOREIGN PATENT DOCUMENTS

| | | |
|---|---|---|
| JP | 202192775 A | 6/2021 |
| TW | 202123688 A | 6/2021 |

* cited by examiner

*Primary Examiner* — Dung T Nguyen
(74) *Attorney, Agent, or Firm* — Li & Cai Intellectual Property (USA) Office

(57) ABSTRACT

An integrated stereoscopic image display device is provided. The integrated stereoscopic image display device includes a display, a lens array layer, and a baffle layer. The display has a display surface and an image computing unit, and the lens array layer is disposed adjacent to the display surface. The baffle layer includes a plurality of baffles that extend along a first inclined direction, and each of the baffles has a rotation angle. The baffles are inclined to the display surface and extend along a second inclined direction, and each of the baffles has an inclination angle.

4 Claims, 16 Drawing Sheets

INTEGRATED STEREOSCOPIC IMAGE DISPLAY DEVICE

CROSS-REFERENCE TO RELATED PATENT APPLICATION

This application claims the benefit of priority to Taiwan Patent Application No. 111116598, filed on May 3, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an integrated stereoscopic image display device, and more particularly to an integrated stereoscopic image display device adopting an autostereoscopic technology and being simple and convenient to use in a 3D stereoscopic display.

BACKGROUND OF THE DISCLOSURE

The conventional stereoscopic image display device is generally made by using binocular fusion image technology. Generally, a conventional autostereoscopic image display device allows the viewer to view an image from an angle facing the display device, or otherwise does not allow the image to extend too far away from the display surface. However, when considering certain situations, such as aviation terrain models, architectural models, medical 3D training, etc., in which the display device is placed horizontally, a natural viewing angle of the viewer is to view the display device in an oblique direction. At this time, a conventional stereoscopic image display technology cannot provide the viewer with a natural viewing angle, thereby causing inconvenience. Further, it is common for the conventional stereoscopic image display devices to have a 3D image viewed from the front be a visual stimulus in only one direction for the viewer, that is similar to protruding or sinking portions on a screen, such that an effect of the image being away from the display surface and floating is not achieved. In addition, in the conventional stereoscopic image display device, a light distribution of the light source of the display device has a large divergence angle, which causes the viewer that moves to see other levels of light and has the problem of a poor image quality, so that it is difficult to improve a stereoscopic image display effect.

The applicant proposes an "integrated image display device" (Taiwan Patent Publication No. TW202123688A), which can provide the effect of a floating display, and allow viewers to view stereoscopic images at positive and oblique angles. Further, the image quality can be improved so that a divergence angle of the light from the display can be limited, so as to eliminate other layers of light, thereby resulting in a better stereoscopic image display effect. However, in order to block light distribution in two levels, two layers of baffles must be used in the display device, so that the structure becomes relatively complicated, and has a large thickness so as to take up more space. Further, a multi-layer structure has a large loss of brightness, and due to the multi-layer structure being a periodic structure, a moiré pattern is easily generated.

SUMMARY OF THE DISCLOSURE

In response to the above-referenced technical inadequacies, the present disclosure provides an integrated stereoscopic image display device, which can provide an effect of a floating display and allow viewers to view stereoscopic images at an oblique angle, and the image quality can be improved. Further, a divergence angle of light from the display can be limited so as to eliminate other layers of light, thereby resulting in a better stereoscopic image display. The present disclosure only needs to use one layer of baffles, which has a simple structure, is easy to manufacture, and has a thin thickness, so that an occupied space can be decreased. The one-layer structure of the present disclosure can increase the transmittance of outgoing light and reduce the probability of generating a moiré pattern.

In one aspect, the present disclosure provides an integrated stereoscopic image display device, which includes a display, a lens array layer, and a baffle layer. The display has a display surface and an image computing unit. The lens array layer is disposed adjacent to the display surface of the display and includes a plurality of lenses. The baffle layer includes a plurality of baffles. The baffles are arranged at intervals and extend along a first inclined direction, and the baffle layer has a reference edge, each of the baffles respectively has a first included angle with the reference edge, so that each of the baffles has a rotation angle. The baffles are inclined to the display surface and extend along a second inclined direction, and each of the baffles respectively has a second included angle with the display surface, so that each of the baffles has an inclination angle. A translucent part is formed between two adjacent ones of the baffles, and an opening is formed at one end of the translucent part away from the display, such that the baffles provide a shading effect to limit a divergence angle of a light generated by the display. Therefore, an unreconstructed image displayed on the display surface can be recombined through the lens array layer to form an integrated image, so as to form a three-dimensional image.

In another aspect, the present disclosure provides an integrated stereoscopic image display device, which includes a display, a pinhole array layer, and a baffle layer. The display has a display surface and an image computing unit. The pinhole array layer includes a main body and a plurality of pinholes arranged on the main body. The baffle layer includes a plurality of baffles. The baffles are arranged at intervals and extend along a first inclined direction, and the baffle layer has a reference edge, each of the baffles respectively has a first included angle with the reference edge, so that each of the baffles has a rotation angle. The baffles are inclined to the display surface and extend along a second inclined direction, and each of the baffles respectively has a second included angle with the display surface, so that each of the baffles has an inclination angle. A translucent part is formed between two adjacent ones of the baffles, and an opening is formed at one end of the translucent part away from the display, such that the baffles provide a shading effect to limit a divergence angle of a light generated by the display. Therefore, an unreconstructed image displayed on the display surface can be recombined through the pinhole array layer to form an integrated image, so as to form a three-dimensional image.

In yet another aspect, the present disclosure provides an integrated stereoscopic image display device, which includes a display and a baffle layer. The display includes a liquid crystal panel, a backlight module, and an image computing unit, the liquid crystal panel has a display surface, the liquid crystal panel is configured to turn on a plurality of pixels that are to be used and turn off a plurality of pixels that that are not to be used, and the backlight module includes a plurality of light sources. The baffle layer includes a plurality of baffles. The baffles are arranged at intervals and extend along a first inclined direction, and the baffle layer has a reference edge, each of the baffles respectively has a first included angle with the reference edge, so that each of the baffles has a rotation angle. The baffles are inclined to the display surface and extend along a second inclined direction, and each of the baffles respectively has a second included angle with the display surface, so that each of the baffles has an inclination angle. A translucent part is formed between two adjacent ones of the baffles, and an opening is formed at one end of the translucent part away from the display, such that the baffles provide a shading effect to limit a divergence angle of a light generated by the display. Therefore, an unreconstructed image displayed on the display surface can be recombined through the light sources and the liquid crystal panel to form an integrated image, so as to form a three-dimensional image.

Therefore, in the integrated stereoscopic image display device provided by the present disclosure, an effect of a floating display can be provided, so that viewers are able to view stereoscopic images at an oblique angle. Further, by virtue of the baffle layer including the plurality of baffles, and the baffles having the inclination angle and the rotation angle, an effect of shading can be provided, and a problem that the light distribution of the light source of the display having a large divergence angle and causing the viewer to see other levels of light when moving can be addressed, thereby improving an image quality. Furthermore, a divergence angle of the light generated by the display can be limited, so as to eliminate other levels of light, thereby resulting in a better stereoscopic image display effect. In addition, the baffles are provided in a single layer, which has a simple structure, is easy to manufacture, and has a thin thickness, so that the occupied space can be decreased. The one-layer structure of the present disclosure can increase the transmittance of outgoing light and reduce the probability of generating a moiré pattern.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
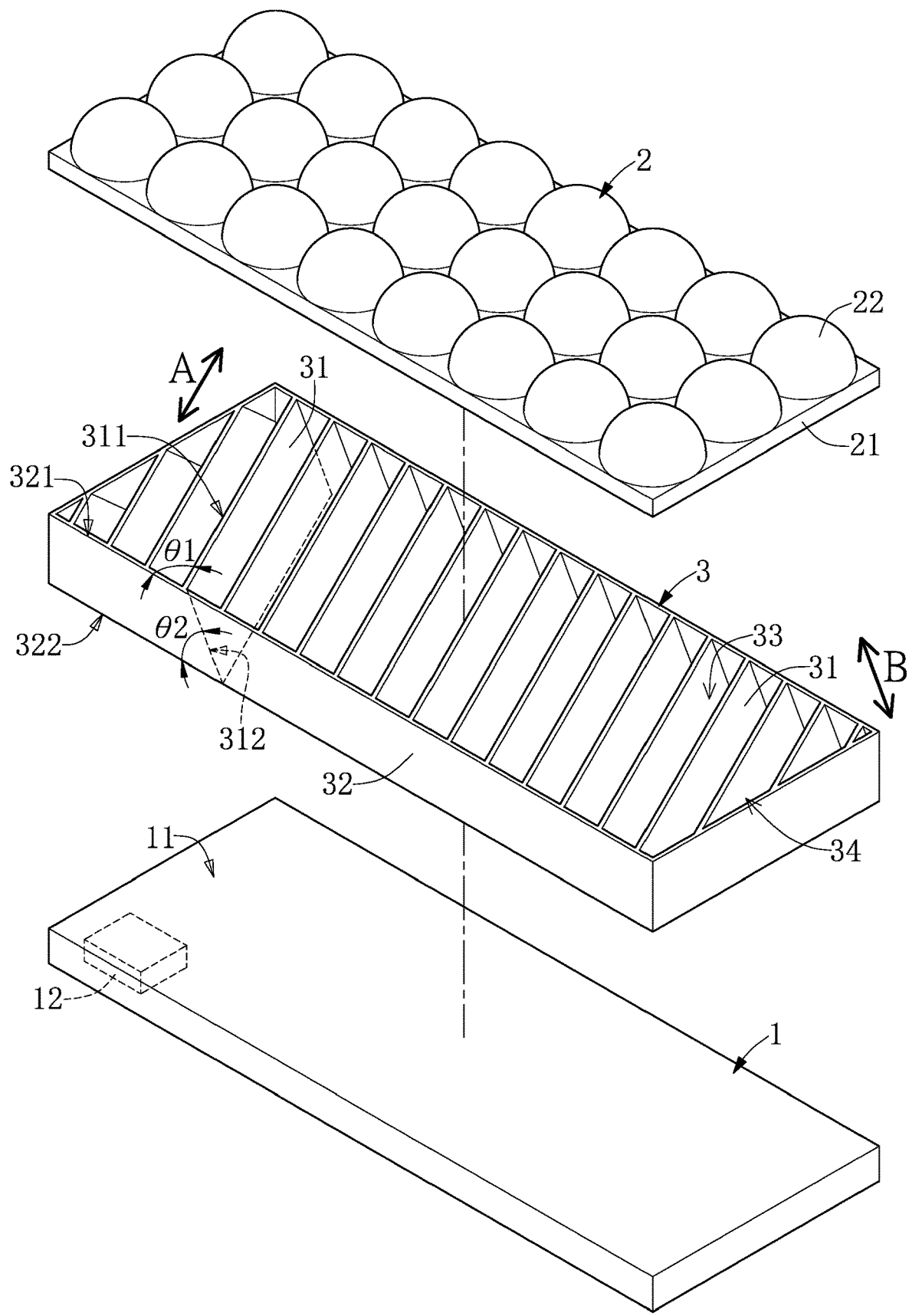
FIG. 1 is a schematic exploded view of an integrated stereoscopic image display device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

The present disclosure provides an integrated stereoscopic image display device, which can be adopted by various industries such as optoelectronics, medical, military, exhibition, display, education and entertainment, and consumer electronics. The integrated stereoscopic image display device can be applied to active or passive displays, but is not limited thereto.

Figure 2:
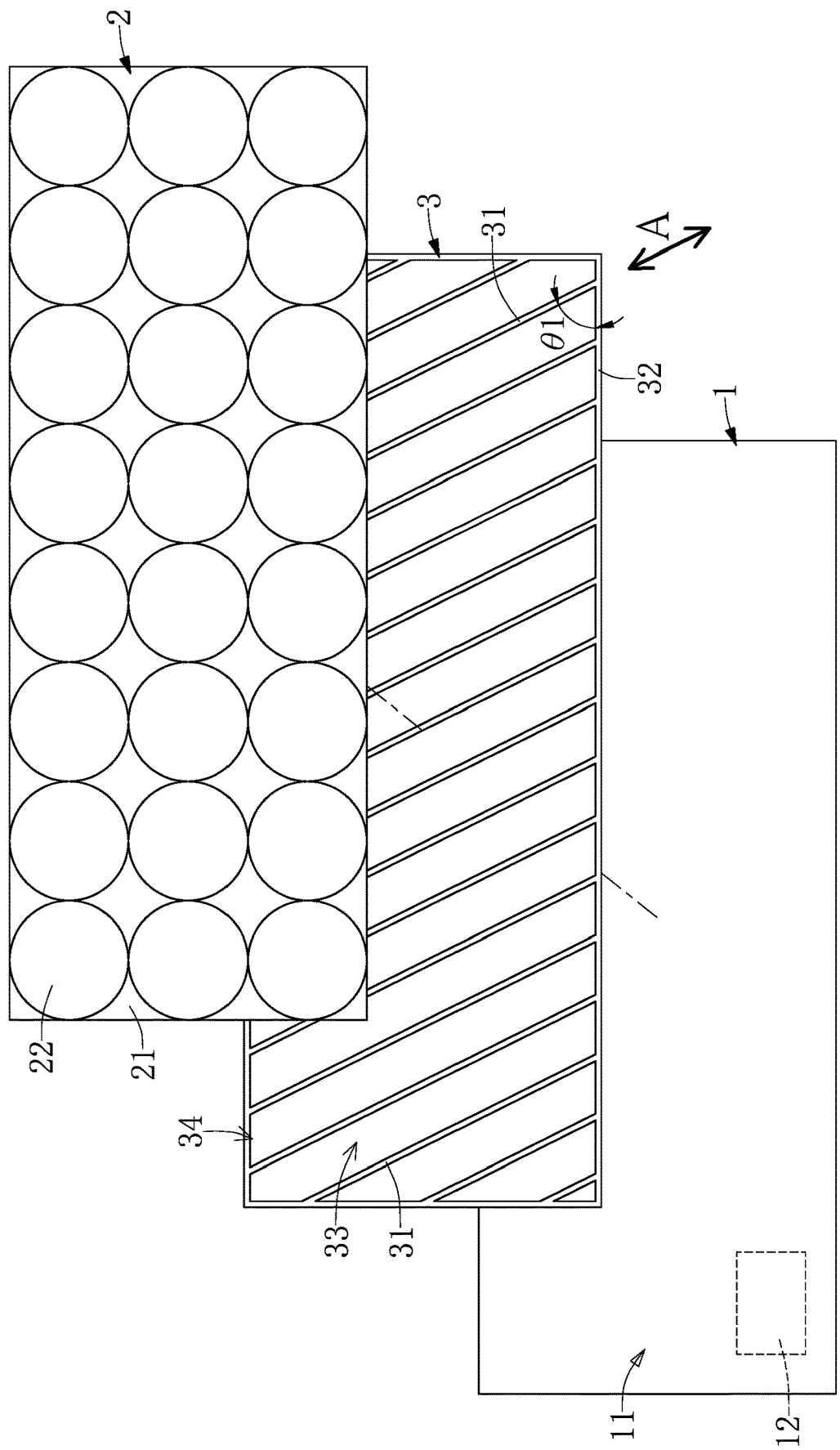
FIG. 2 is a schematic top exploded view of the integrated stereoscopic image display device according to the first embodiment of the present disclosure.
Figure 3:
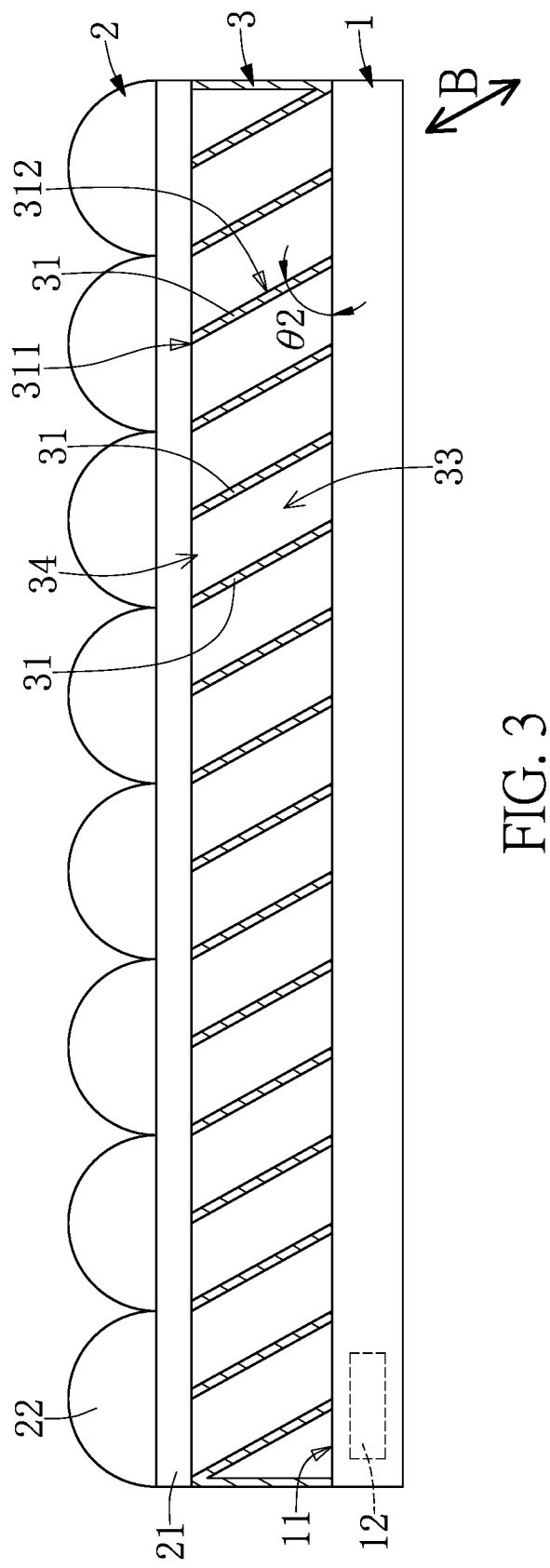
FIG. 3 is a schematic front view of the integrated stereoscopic image display device according to the first embodiment of the present disclosure.

Referring to FIG. 1 to FIG. 3, the integrated stereoscopic image display device includes a display 1, a lens array layer 2, and a baffle layer 3, and the integrated stereoscopic image display device can change the stereoscopic image seen by a viewer from an angular position of the user by changing an image that is displayed, so that the viewer can view a stereoscopic image at other viewing angles.

The display 1 can be a flat-panel display, and the display 1 has a display surface 11 that can be used to display images. The lens array layer 2 is disposed adjacent to the display surface 11 of the display 1, that is, the lens array layer 2 can be disposed above the display 1. The lens array layer 2 can be connected to the display surface 11 of the display 1. The lens array layer 2 can also be spaced from the display surface 11 of the display 1, or an intermediate layer can be arranged between the display surface 11 of the display 1 and the lens array layer 2.

The display 1 can be placed at a bottom layer of the integrated stereoscopic image display device and is responsible for displaying a flat image that has not been reproduced by light. The flat image can be redistributed and combined through a lens array of the lens array layer 2 so that a recombined three-dimensional image is displayed. The display 1 of a first layer only needs to display an image, and can be of any hardware structure, including a mobile phone, a tablet, or a flat screen. A type and structure of the display 1 are not limited, and the display 1 can also be a self-luminous display.

The lens array layer 2 can be disposed on a top layer of the integrated stereoscopic image display device and has the function of regulating a light field. The lens array layer 2 can adjust a light angle of three-dimensional objects to redistribute and combine the flat images that have not been recombined, so that the viewer can see three-dimensional images.

Figure 18:
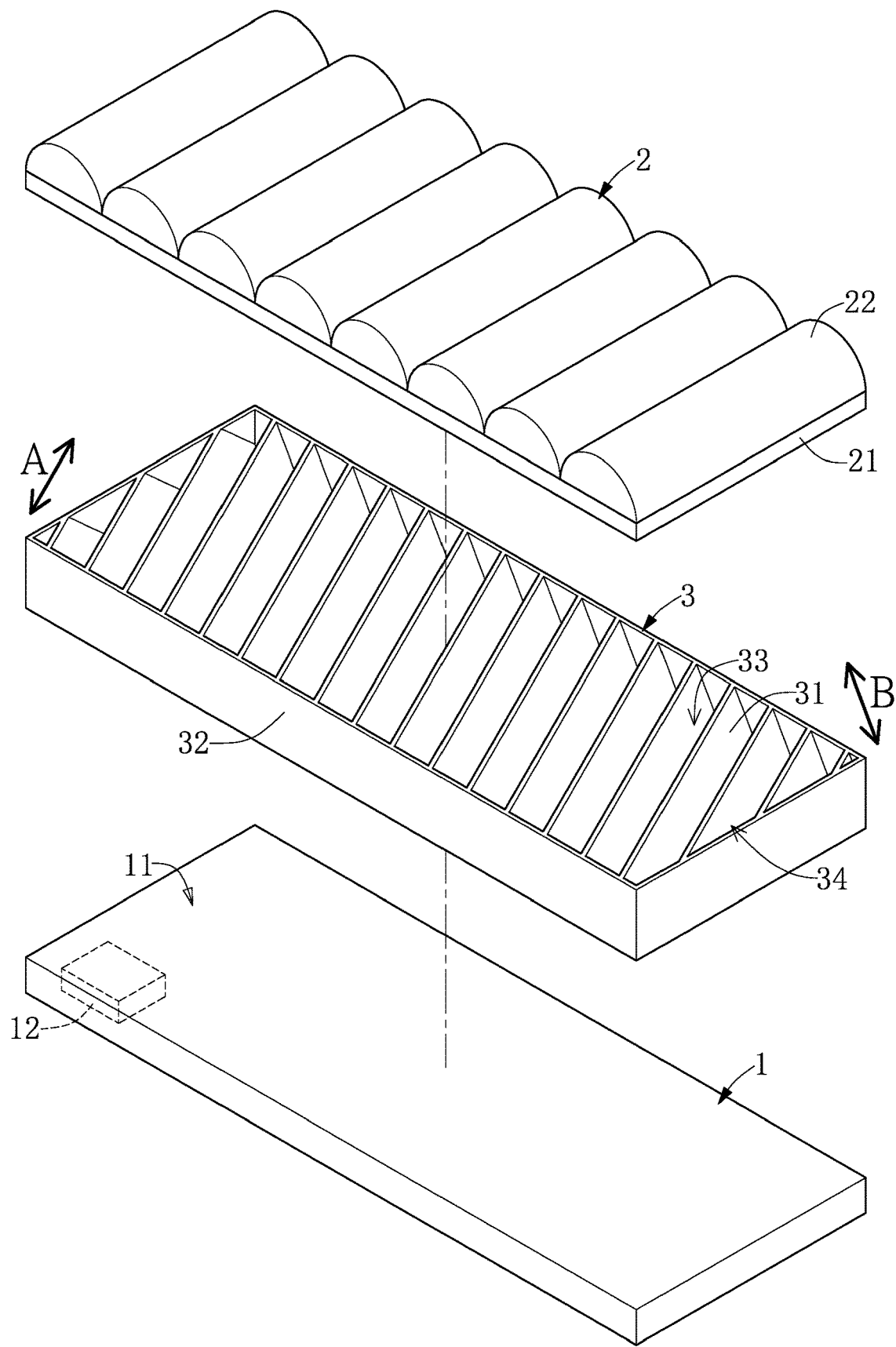
FIG. 18 is a schematic view of using lenticular lenses in the first embodiment of the integrated stereoscopic image display device of the present disclosure.

The lens array layer 2 can include a base part 21 and a plurality of lenses 22, and the lenses 22 are arranged on one side of the base part 21, that is, the lenses 22 can be arranged on the one side of the base part 21 away from the display 1, in which an arrangement and structure of the lens array layer 2 are not limited. Each of the lenses 22 has a focusing function, and the unreconstructed images displayed on the display surface 11 can be recombined through the lens array layer 2 to form an integrated image, so as to form a three-dimensional image. The structure and material of the lens array layer 2 are not limited, and the lenses 22 can also be, for example, lenticular lenses (as shown in FIG. 18), Fresnel lenses, or other lens sets of various types.

The integrated stereoscopic image display device of the present disclosure can allow the three-dimensional images to be viewed in an oblique direction. The viewing of three-dimensional images in an oblique direction indicates that the viewer can still see the stereoscopic images when the viewer does not directly face the display 1. Most of the conventional autostereoscopic three-dimensional displays have viewing angle issues, such that viewers cannot see three-dimensional images at oblique angles. On the other hand, the oblique viewing capability is a major feature of the present disclosure. When the viewer faces a front of the display 1 in a direction of a zero order viewing zone, a viewing angle restriction is on the left and right sides of the viewer, respectively. Once viewer moves to exceed the viewing angle, the image that the viewer sees will not be the stereoscopic image information that the viewer is intended to see at the corresponding viewing angle. In order to achieve oblique viewing of stereoscopic images, the zero order (front) display mode is no longer used. The display mode mainly adopts a display manner in an oblique angle, and a light path is concentrated in an oblique direction, so that the viewer can view the stereoscopic image in the oblique direction. In addition, the present disclosure can also adopt a microstructure to guide light to an oblique viewing angle. Further, the integrated stereoscopic image display device of the present disclosure can also be applied to viewing stereoscopic images from a frontal angle, and a viewing angle is not limited.

The display 1 can be of any specification as long as the algorithm can be applied to the display 1, that is, the display 1 has an image computing unit 12. The image applied to the display 1 needs to be calculated by an image algorithm, and this calculation is based on the structure of the lens array, and predicts various paths traveled by light, such that a relative position of the image is calculated. Since the image algorithm is a conventional technology and is not the focus of the present disclosure, it will not be iterated herein.

The baffle layer 3 can be disposed on one side of the lens array layer 2. In this embodiment, the baffle layer 3 is disposed on the side of the lens array layer 2 close to the display 1, that is, the baffle layer 3 is disposed under the lens array layer 2, and the baffle layer 3 is located between the display 1 and the lens array layers 2.

The baffle layer 3 has a plate-shaped body and includes a plurality of baffles 31. The baffles 31 are arranged at intervals and can be parallel or non-parallel to each other. In this embodiment, the baffles 31 are parallel to each other. The distance between each of the baffles 31 is not limited, and can be changed according to needs, that is, the baffles 31 can be arranged densely or sparsely as required. In this embodiment, the distance between two adjacent ones of the baffles 31 is smaller than the outer diameter of one of the lenses 22, and the distance between two adjacent ones of the baffles 31 is substantially half of the outer diameter of one of the lenses 22, so that the baffles 31 are arranged densely. The distance between two adjacent ones of the baffles 31 is less than 500 μm, for instance, the distance can be 100 μm, 200 μm, 300 μm, 400 μm, 499 μm, and so on. Preferably, the distance between two adjacent ones of the baffles 31 is 100 μm to 130 μm, such as 100 μm, 105 μm, 110 μm, 115 μm, 120 μm, 125 μm, 130 μm, and so on, so that the baffles 31 can provide a better shading effect. The distances between the baffles 31 can be a constant value or a non-constant value, that is, the distances of the baffles 31 are not limited to be equal distances and can also be unequal distances.

The baffles 31 are rotated at an angle so that the baffles 31 extend along a first inclination direction A (as shown in FIG.

2). Specifically, it can be defined that the baffle layer 3 has a reference edge 32. In this embodiment, the reference edge 32 is the long side of the baffle layer 3, and may be called as a reference side. Referring to FIG. 1, each baffle 31 has a top edge 311 adjacent to the lens array layer 2, and a lateral edge 312 connected to the reference side (32). The reference side (32) has an upper side edge 321 and a lower side edge 322. Each of the baffles 31 respectively has a first included angle θ1 with the reference edge 32, so that each of the baffles 31 has a rotation angle. In other words, the first included angle θ1 is formed between the top edge 311 of the baffle 31 and the upper side edge 321 of the reference side (32). The first included angle θ1 is less than 90 degrees, so that the baffles 31 can provide a better shading effect. A rotational direction of the baffle 31 is not limited. Referring to FIG. 2, each of the baffles 31 has a first included angle θ1 with the reference edge 32 along a counterclockwise direction, on the other hand, each of the baffle 31 can also have a first included angle θ1 with the reference edge 32 along a clockwise direction.

The baffles 31 are inclined to the display surface 11 and the baffles 31 extend along a second inclination direction B (as shown in FIG. 3). Each of the baffles 31 respectively has a second included angle θ2 with the display surface 11, so that each of the baffles 31 has an inclination angle. In other words, the second included angle θ2 is formed between the lateral edge 312 of the baffle 31 and the lower side edge 322 of the reference side (32). Since two dimensions of occlusion need to be provided at the same time, the second included angle θ2 (inclination angle) is preferably greater than 10 degrees. However, if the second included angle θ2 (inclination angle) is too large, the viewing angle will also be too large, so the second included angle θ2 (inclination angle) is preferably less than 80 degrees, that is, the second included angle θ2 can be from 10 degrees to 80 degrees, such as 10 degrees, 20 degrees, 30 degrees, 40 degrees, 50 degrees, 60 degrees, 70 degrees, or 80 degrees. The second included angle θ2 of the baffles 31 can also be a non-constant value, for instance, the second included angle θ2 of an upper half of the baffles 31 is 30 degrees, and the second included angle θ2 of a lower half of the baffles 31 is 45 degrees.

Two adjacent ones of the baffles have a translucent part 33 there-between that is elongated. The translucent parts 33 can be hollow (i.e., have hollow-out shapes), and the translucent parts 33 can have a translucent material provided therein to have a solid shape. An opening 34 is formed at one end of each of the translucent parts 33 away from the display 1, and the direction of the opening 34 that includes the inclination angle and the rotation angle can be directed toward the viewer or toward the opposite side of the viewer. The baffles 31 can provide a shading effect, so that a divergence angle of a light generated by the display 1 can be limited, so as to eliminate other levels of light, and achieve a better three-dimensional image display effect. The unreconstructed image displayed on the display surface 11 can be recombined through the lens array layer 2 to form an integrated image, so as to form a three-dimensional image.

The baffle layer 3 can be disposed between the display 1 and the lens array layer 2, and the baffle layer 3 can also be disposed (or formed) on the display 1 or the lens array layer 2. The baffle layer 3 can improve the image quality, so that the divergence angle of the light generated by the display 1 is limited and the light generated by the display 1 irradiates the lens array layer 2, so as to eliminate other levels of light and achieve a better three-dimensional image display effect. The baffle layer 3 can limit the irradiation of light to be within predetermined angles in the left and right directions (angle control) and the front and rear directions (oblique angle), so as to eliminate other levels of light and achieve a better three-dimensional image display effect.

Figure 4:
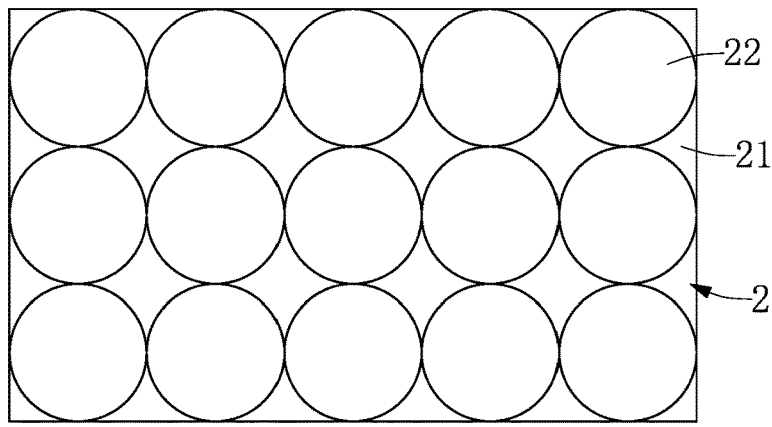
FIG. 4 is a schematic view of a lens array of the present disclosure in a corresponding arrangement.
Figure 5:
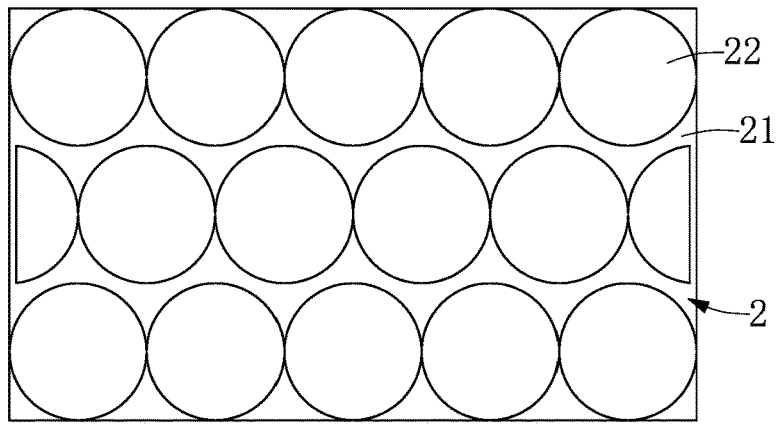
FIG. 5 is a schematic view of the lens array of the present disclosure in a staggered arrangement.

The lens array layer 2 of the present disclosure is crucial to the display effect. Referring to FIG. 4, the arrangement of the lens arrays can be in the form of a rectangular arrangement, so that the lenses 22 in two adjacent columns can be arranged correspondingly. Referring to FIG. 5, the arrangement of the lens array can also be in a hexagonal arrangement, so that the lenses 22 in two adjacent columns can be staggered. The lens array can also be in other arrangements, in which 3D image information can be displayed.

Figure 6:
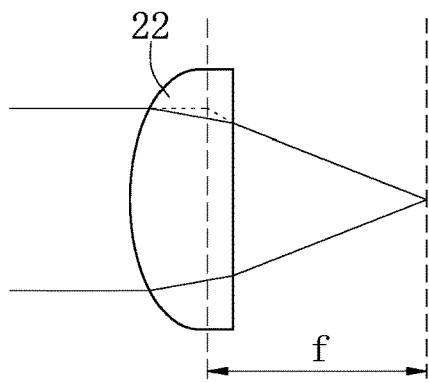
FIG. 6 is a schematic view of a single lens of the present disclosure being used to focus.

The microstructures on the lens array layer 2 are micro-lenses having a focusing function. The specification of the micro-lenses determines the focusing ability of the lens according to a refractive index n of the material. The wavelength range of the usable light is from 300 nm to 1100 nm. The focal length of a single microlens is as shown in FIG. 6, and conforms to the formula provided by maker of lens of: $1/f=(n-1)(1/R1-1/R2)$, in which R1 and R2 respectively are the radii of curvature on both sides of the lens, f is the focal length of the lens, and n is the refractive index of the lens. In addition, the diameter of the lens is from 100 μm to 5 mm, which is suitable for the pixel size of different display devices.

The present disclosure provides an integrated stereoscopic image display device that is suitable for oblique viewing and can control a light traveling direction of pixels on each position in the device through the optical element in cooperation with hardware configurations. A hardware system of the present disclosure is a simple optical element, and includes the display 1, the lens array layer 2 and the baffle layer 3 that can be packaged into a set. With the design of pixel size, system gap, lens size, and focal length, and by using the principle of integrated imaging, matching a screen output picture signal with a special algorithm, the integrated stereoscopic image display device can present a realistic image in a three-dimensional space.

Second Embodiment

Figure 7:
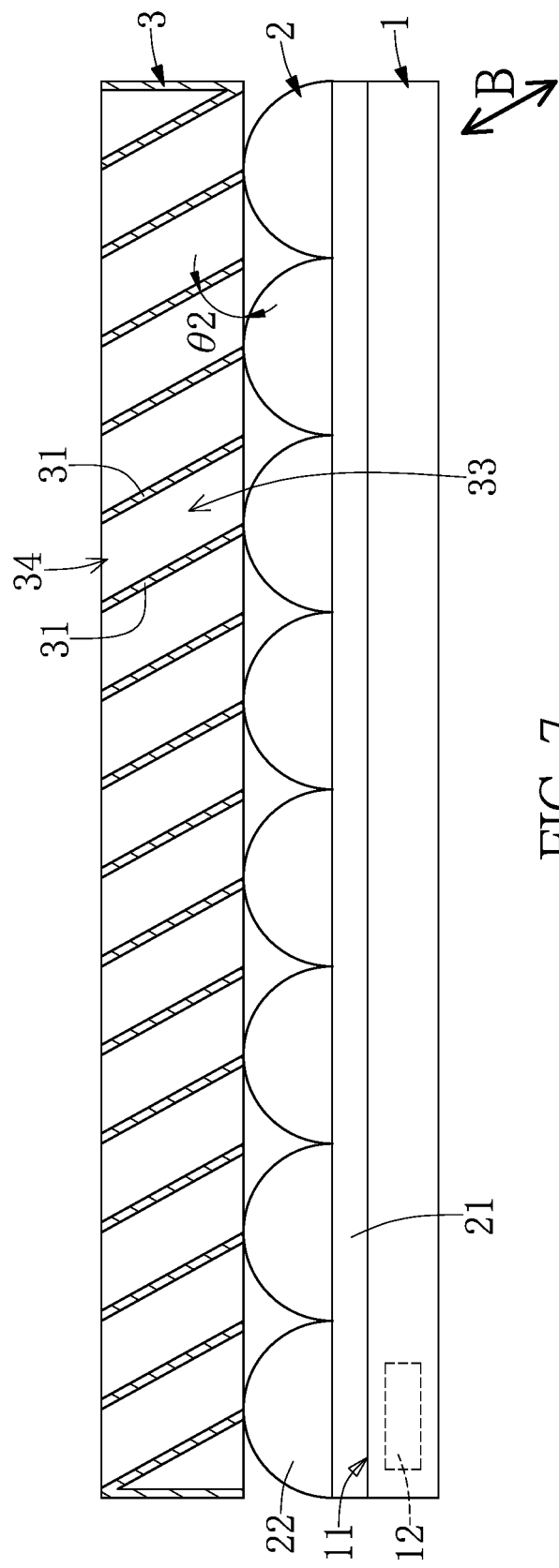
FIG. 7 is a schematic front view of an integrated stereoscopic image display device according to a second embodiment of the present disclosure.

Referring to FIG. 7, the structure of this embodiment is substantially the same as that of the above-mentioned first embodiment, and the difference lies in that, in this embodiment, the baffle layer 3 is disposed on one side of the lens array layer 2 away from the display 1, that is, the baffle layer 3 is disposed above the lens array layer 2. The baffles 31 can provide a shading effect to eliminate other levels of light, so as to have a better three-dimensional image display effect.

Third Embodiment

Figure 8:
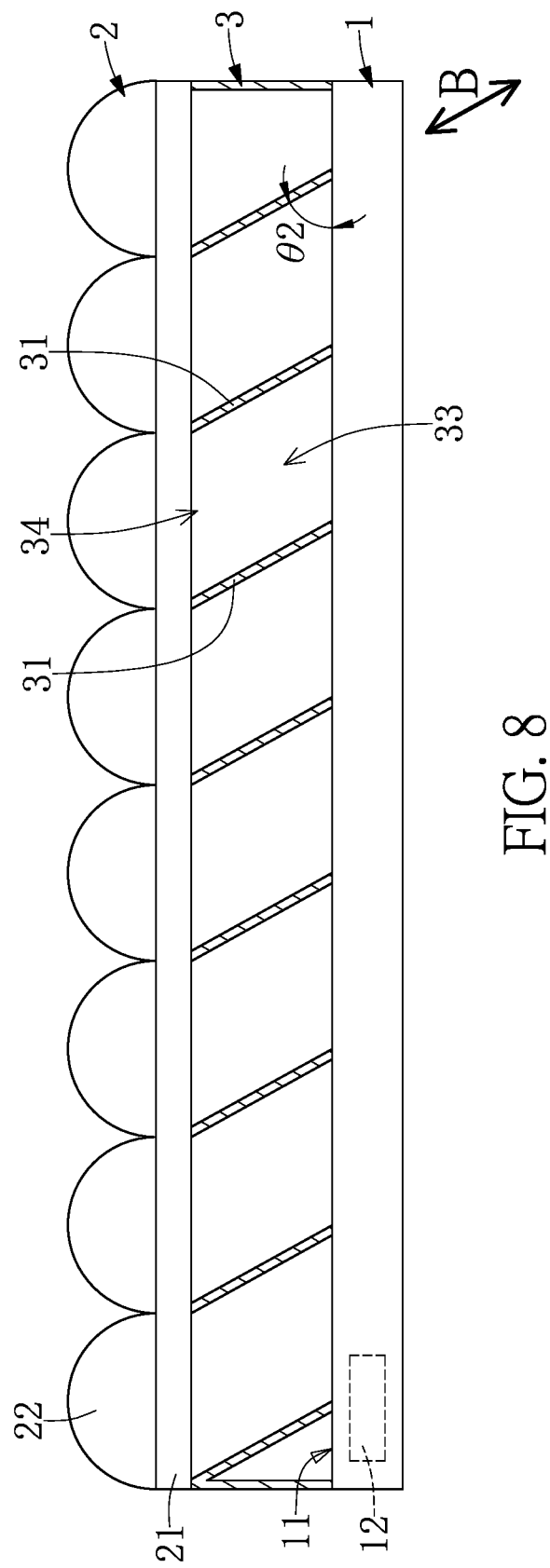
FIG. 8 is a schematic front view of an integrated stereoscopic image display device according to a third embodiment of the present disclosure.

Referring to FIG. 8, the structure of this embodiment is substantially the same as that of the above-mentioned first embodiment. The difference is that, in this embodiment, the distance between two adjacent ones of the baffles 31 is equal to the outer diameter of the lens 22, and the baffles 31 are arranged more sparsely.

Fourth Embodiment

Figure 9:
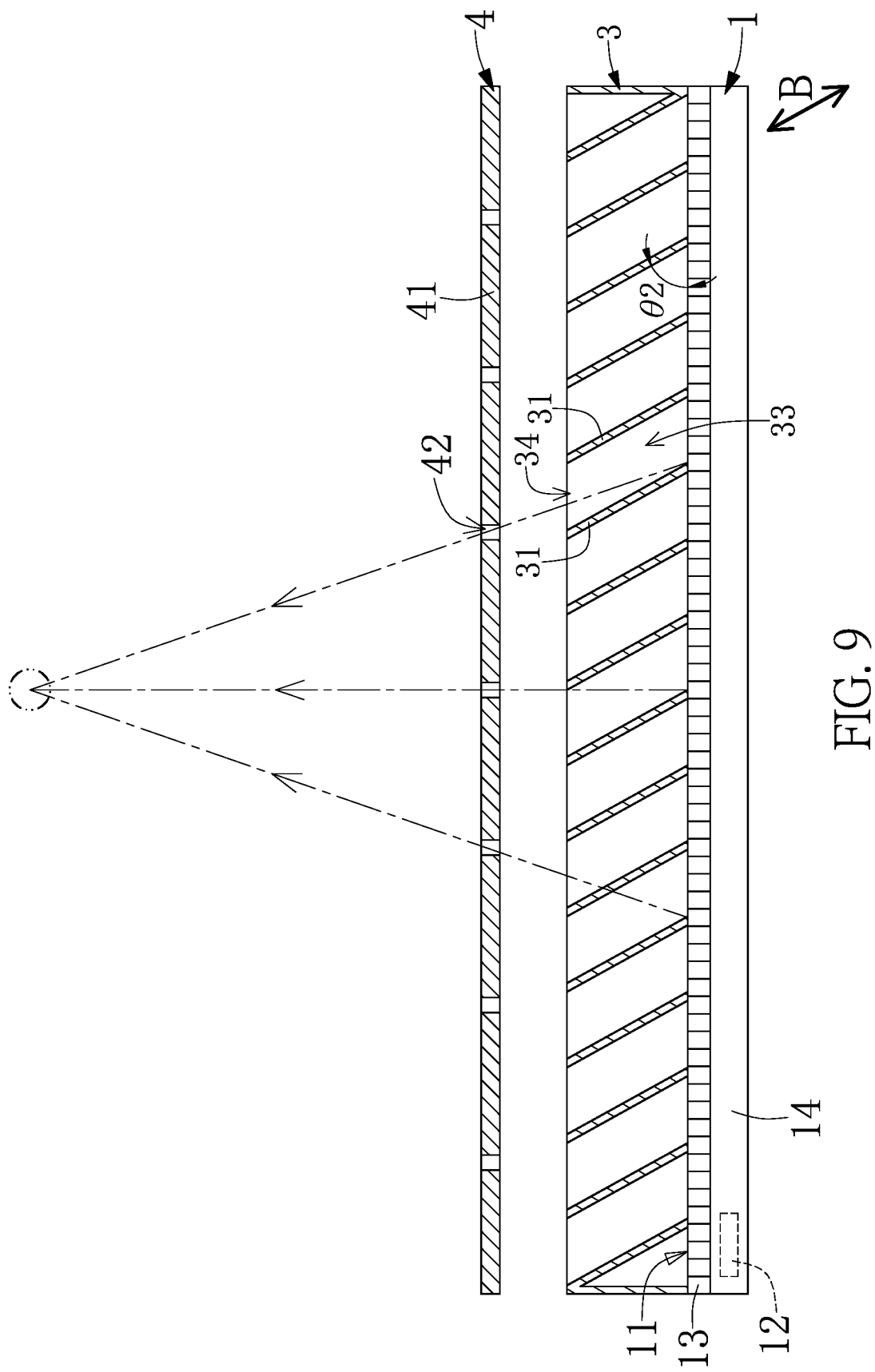
FIG. 9 is a schematic front view of an integrated stereoscopic image display device according to a fourth embodiment of the present disclosure.

Referring to FIG. 9, in this embodiment, a pinhole array layer 4 is mainly used to replace the lens array layer 2 in the first embodiment. The integrated stereoscopic image display device includes a display 1, the pinhole array layer 4, and a baffle layer 3. The display 1 can include a liquid crystal panel 13 and a backlight module 14, a display surface 11 is located on the liquid crystal panel 13, and the backlight module 14 is close to the liquid crystal panel 13. The backlight module 14 can project a light source, so that the light transmits information to the eyes of the viewer after passing through the liquid crystal panel 13. In this embodiment, the display 1 is a passive light-emitting display. In other embodiments, the display 1 can also be an active light-emitting display, such as an OLED or LED display. Since the structure of the baffle layer 3 is the same as that of the first embodiment, it will not be reiterated herein.

The pinhole array layer 4 can be disposed adjacent to the display surface 11 of the display 1, that is, the pinhole array layer 4 can be disposed above the display 1. The pinhole array layer 4 can contact the display surface 11 of the display 1, and the pinhole array layer 4 can also be spaced apart from the display surface 11 of the display 1. Alternatively, an intermediate layer is provided between the display surface 11 of the display 1 and the pinhole array layer 4. The pinhole array layer 4 can also be disposed in the display 1 or other suitable positions.

The display 1 can be placed at the bottom layer of the integrated stereoscopic image display device and is responsible for displaying a flat image that has not been reproduced by light. The flat image can be redistributed and combined through a pinhole array of the pinhole array layer 4 to display a recombined three-dimensional image. The pinhole array layer 4 can be disposed on the top layer of the integrated stereoscopic image display device and has the function of regulating the light field. The pinhole array layer 4 can adjust the light angle of three-dimensional objects to redistribute and combine the flat images that have not been recombined, so that the viewer can see three-dimensional images.

The material of the pinhole array layer 4 is not limited. The pinhole array layer 4 includes a main body 41 and a plurality of pinholes 42. The main body 41 is made of an opaque material, so that the main body 41 is an opaque member and is a plate-shaped body. The pinholes 42 are preferably round holes, the pinholes 42 are disposed on the main body 41, and the pinholes 42 can pass through opposite sides (both sides) of the main body 41. The distance between two adjacent ones of the pinholes 42 is less than 5 mm, the diameter of each of the pinholes 42 is less than 1 mm, and each of the pinholes 42 has a focusing function. The unreconstructed images displayed on the display surface 11 can be recombined through the pinholes 42 using the pinhole principle and recombined into an integrated image to form a three-dimensional image. The pinhole 42 can be hollow, or a light-transmitting material can be provided in the pinhole 42 so that light can pass through the pinhole 42. The pinhole array layer 4 of the present disclosure is crucial to the display effect. The arrangement of the pinhole array can be a rectangular arrangement or a hexagonal arrangement, that is, the pinholes 42 of two adjacent columns can be arranged in a corresponding arrangement or a staggered arrangement, and both arrangements can be used to display 3D image information.

The baffle layer 3 includes a plurality of baffles 31 arranged at intervals. The baffles 31 extend along a first inclination direction A (as shown in FIG. 2) and each of the baffles 31 has a rotation angle. The baffles 31 extend along a second inclination direction B and each of the baffles 31 has an inclination angle. A translucent part 33 is formed between two adjacent ones of the baffles 31, and the translucent parts 33 are elongated. In this embodiment, the distance between two adjacent ones of the baffles 31 is smaller than the distance between two adjacent ones of the pinholes 42. The translucent parts 33 can allow light to pass through, and the baffle layer 3 can provide a shading effect, so that the divergence angle of the light generated by the display 1 is limited and the light generated by the display 1 irradiates the pinhole array layer 4, so as to eliminate other levels of light and achieve a better three-dimensional image display effect.

Fifth Embodiment

Figure 10:
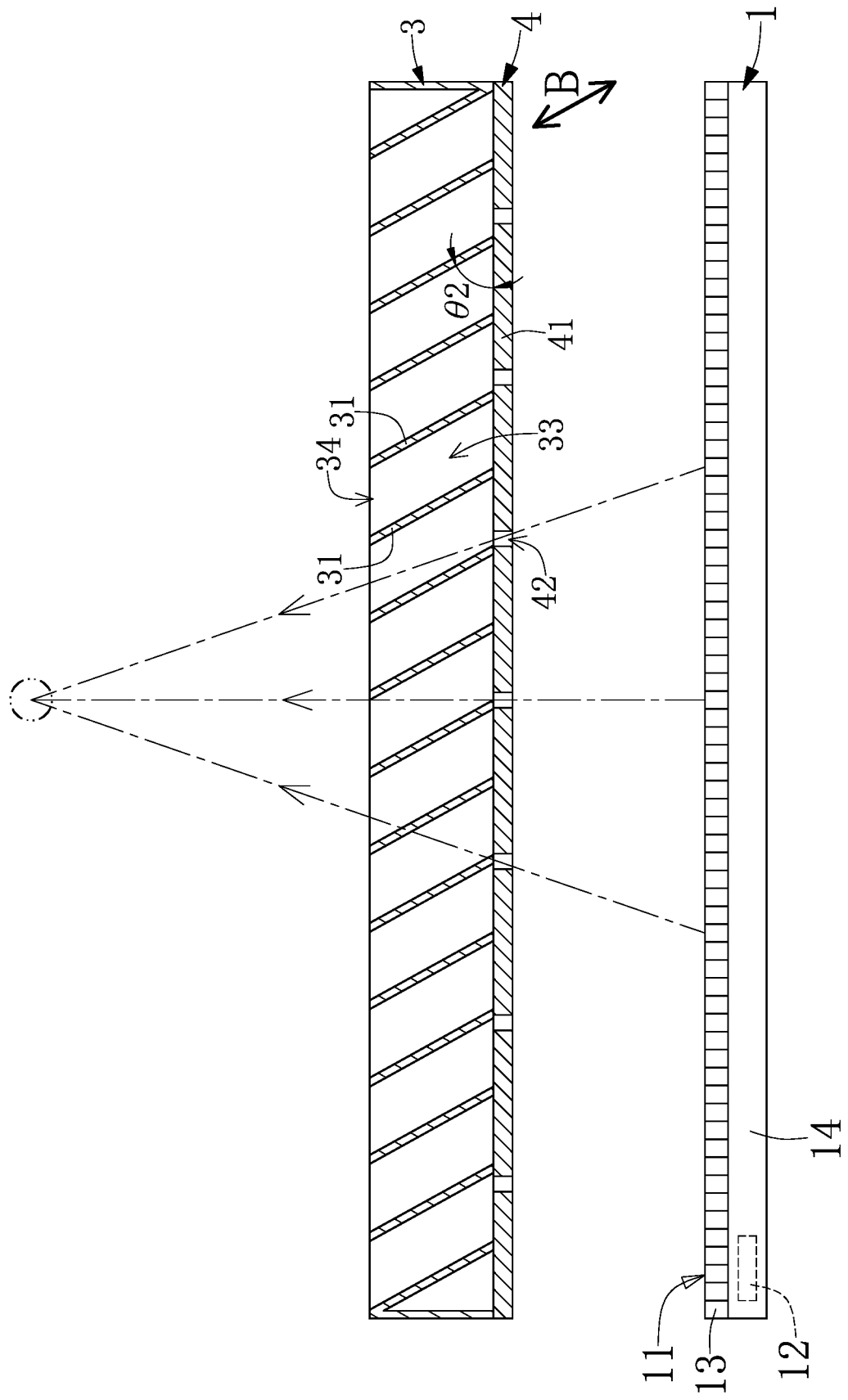
FIG. 10 is a schematic front view of an integrated stereoscopic image display device according to a fifth embodiment of the present disclosure.

Referring to FIG. 10, the structure of this embodiment is substantially the same as that of the above-mentioned fourth embodiment, and the difference lies in that, in this embodiment, the baffle layer 3 is disposed on one side of the pinhole array layer 4 away from the display 1, that is, the baffle layer 3 is disposed above the pinhole array layer 4. The baffles 31 can provide a shading effect to eliminate other levels of light, so as to have a better three-dimensional image display effect.

Sixth Embodiment

Figure 11:
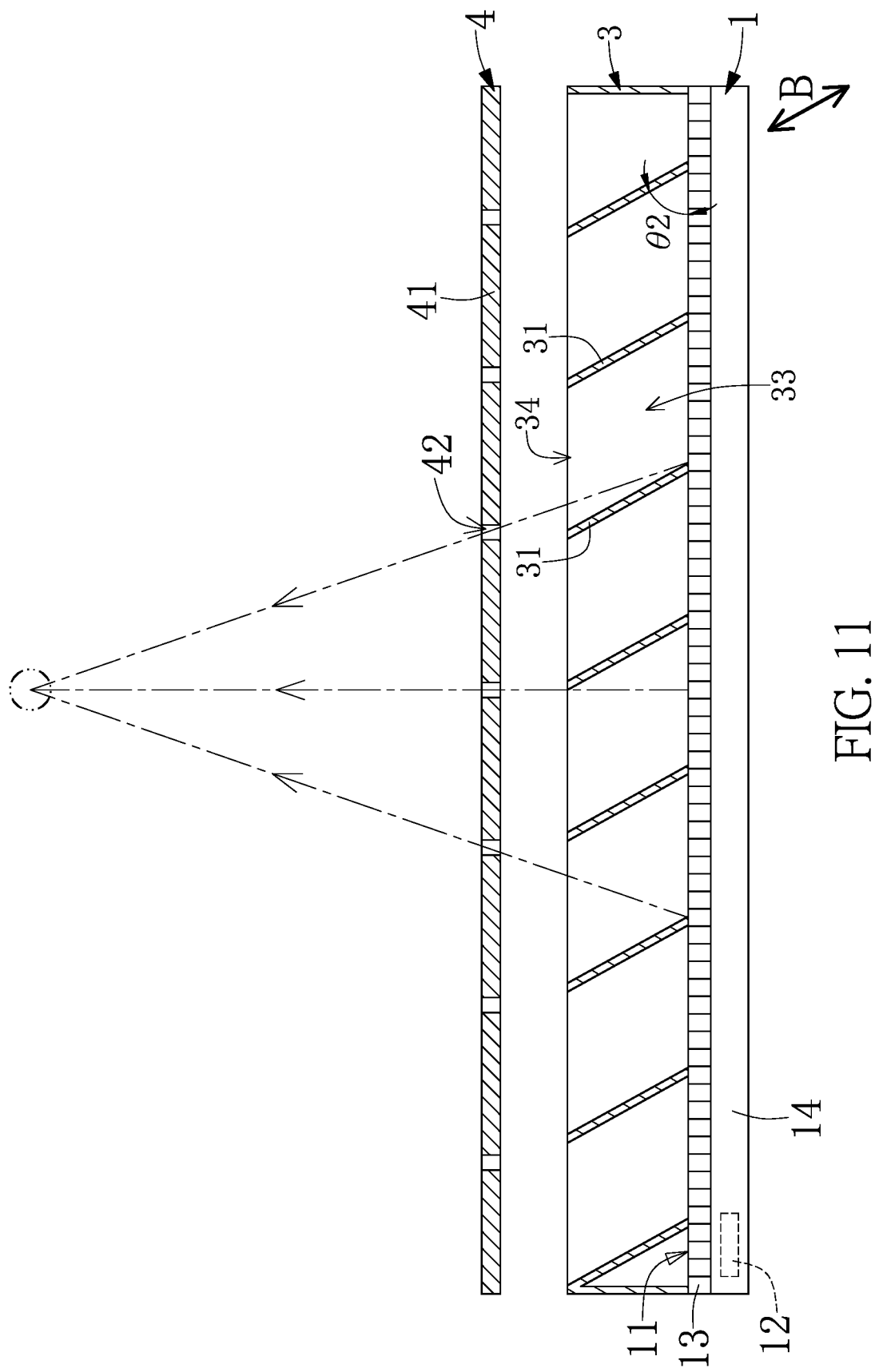
FIG. 11 is a schematic front view of an integrated stereoscopic image display device according to a sixth embodiment of the present disclosure.

Referring to FIG. 11, the structure of this embodiment is substantially the same as that of the above-mentioned fifth embodiment. The difference is that, in this embodiment, the distance between two adjacent ones of the baffles 31 is equal to the distance between two adjacent ones of the pinholes 42. The baffles 31 can provide a shading effect to eliminate other levels of light, so as to have a better three-dimensional image display effect.

Seventh Embodiment

Figure 12:
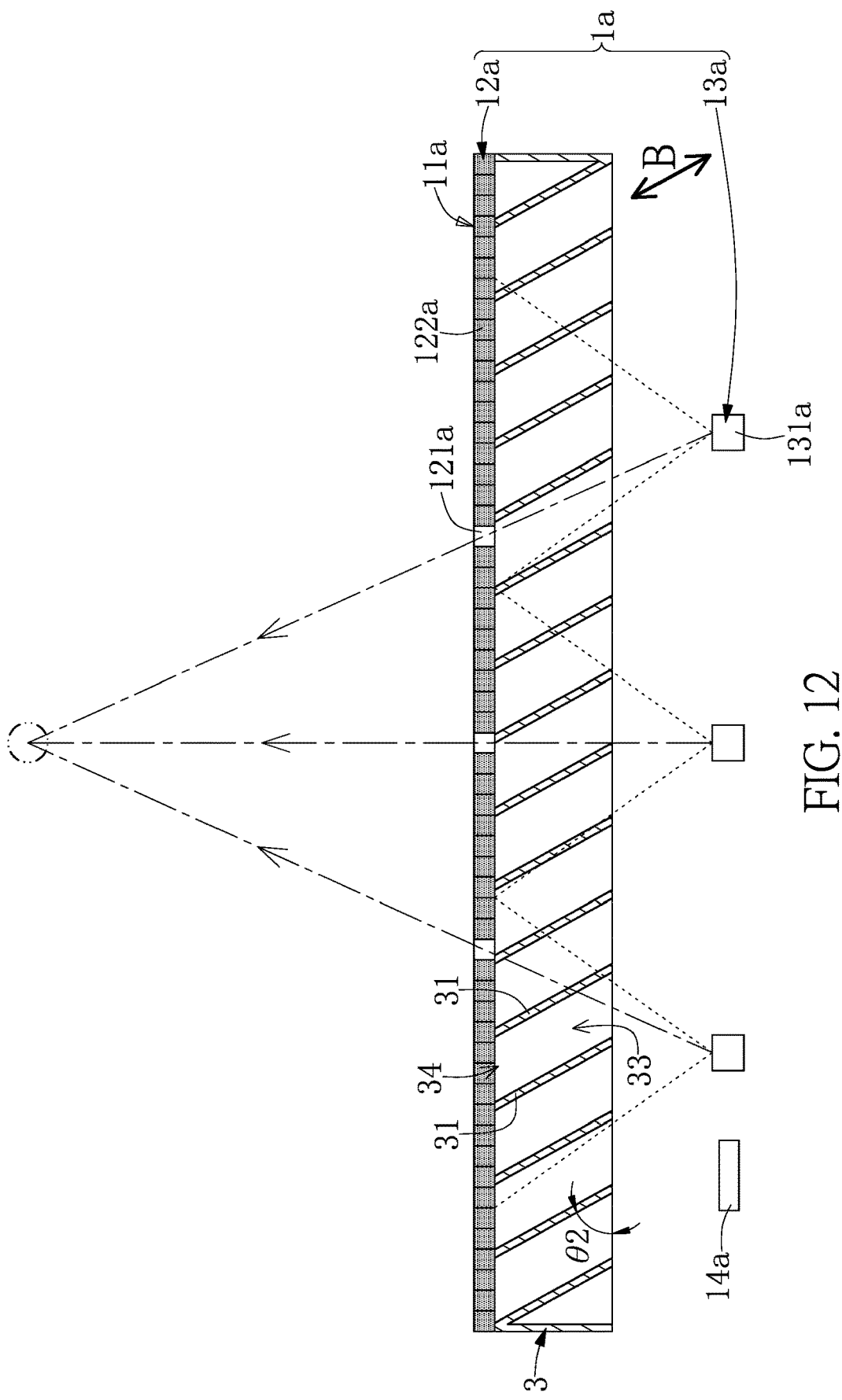
FIG. 12 is a schematic front view of an integrated stereoscopic image display device according to a seventh embodiment of the present disclosure.

Referring to FIG. 12, in this embodiment, the integrated stereoscopic image display device includes a display 1a and a baffle layer 3. The display 1a includes a liquid crystal panel 12a, a backlight module 13a, and an image computing unit 14a.

The liquid crystal panel 12a has a display surface 11a, and the backlight module 13a can project a light source, so that the light transmits information to the eyes of the viewer after passing through the liquid crystal panel 12a. In this embodiment, the liquid crystal panel 12a can use software to turn on the pixels 121a that are to be used and turn off the pixels 122a that that are not to be used. The backlight module 13a includes a plurality of light sources 131a. The light sources 131a can be LED or OLED light sources. The light sources 131a are arranged at intervals and can provide functions similar to functions of a pinhole array layer. The light sources 131a are capable of projecting light, so that the light transmits information to the eyes of the viewer after passing through the liquid crystal panel 12a. The flat image of the display 1a can be transmitted through the light sources 131a and the liquid crystal panel 12a to display the recombined three-dimensional image.

The structure of the baffle layer 3 is the same as that of the first embodiment, and the baffle layer 3 includes a plurality of baffles 31 arranged at intervals. The baffles 31 extend along a first inclination direction A (as shown in FIG. 2) and each of the baffles 31 has a rotation angle. The baffles 31 extend along a second inclination direction B and each of the baffles 31 has an inclination angle. A translucent part 33 is formed between two adjacent ones of the baffles 31, and the translucent parts 33 are elongated. In this embodiment, the distance between two adjacent ones of the baffles 31 is smaller than the distance between two adjacent ones of the pixels 121a that are to be used.

The baffle layer 3 can be disposed on one side (above or below) of the liquid crystal panel 12a. In this embodiment, the baffle layer 3 is disposed on the side of the liquid crystal panel 12a close to the backlight module 13a. The translucent parts 33 can allow light to pass through, and the baffle layer 3 can provide a shading effect, so that the divergence angle of the light generated by the display 1a is limited and the light generated by the display 1 irradiates the pixels 121a that are to be used, so as to eliminate other levels of light and achieve a better three-dimensional image display effect.

Eighth Embodiment

Figure 13:
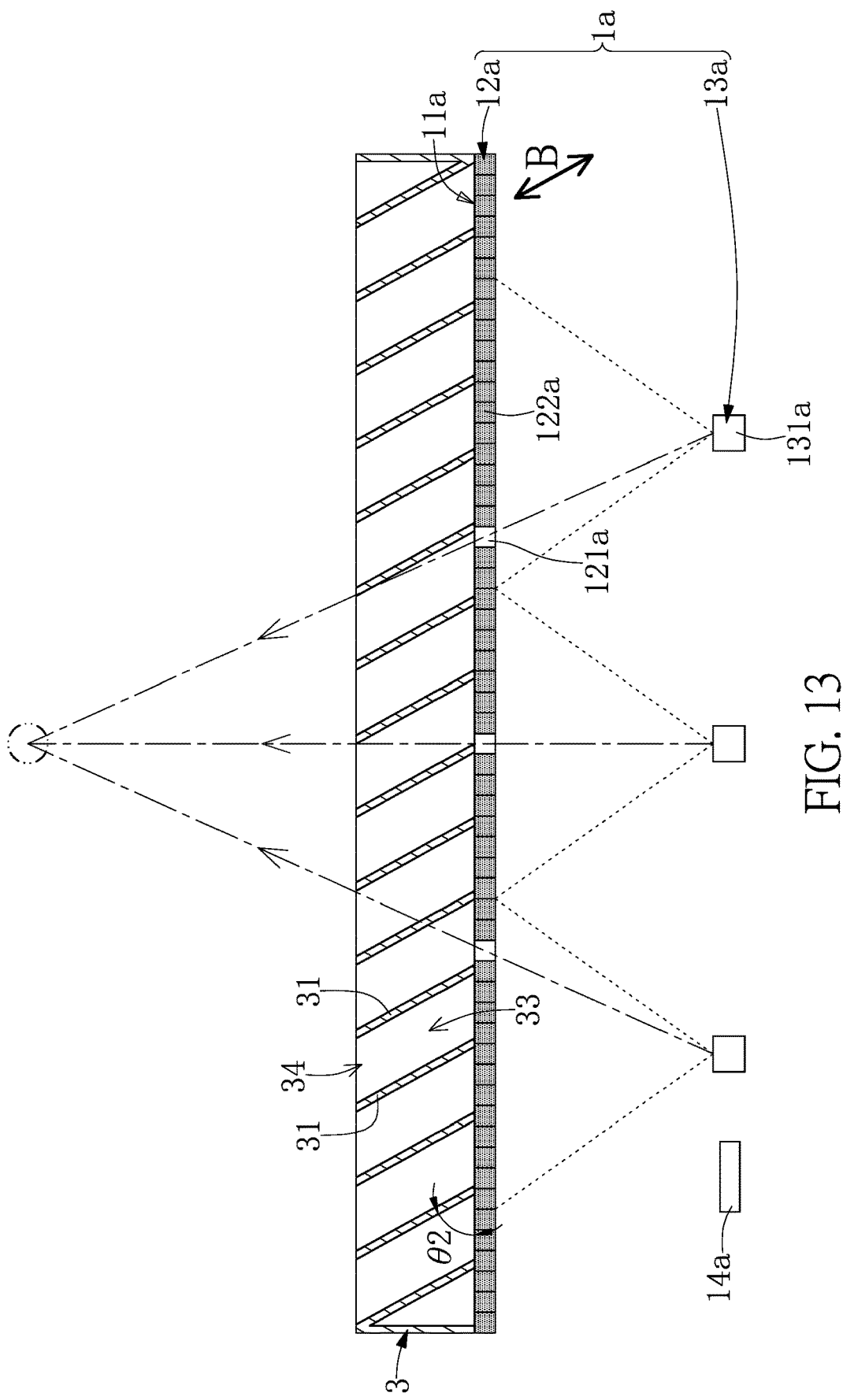
FIG. 13 is a schematic front view of an integrated stereoscopic image display device according to an eighth embodiment of the present disclosure.

Referring to FIG. 13, the structure of this embodiment is substantially the same as that of the above-mentioned seventh embodiment, and the difference lies in that, in this embodiment, the baffle layer 3 is disposed on one side of the liquid crystal panel 12a away from the display 1, that is, the baffle layer 3 is disposed above the liquid crystal panel 12a. The baffles 31 can provide a shading effect to eliminate other levels of light, so as to have a better three-dimensional image display effect.

Ninth Embodiment

Figure 14:
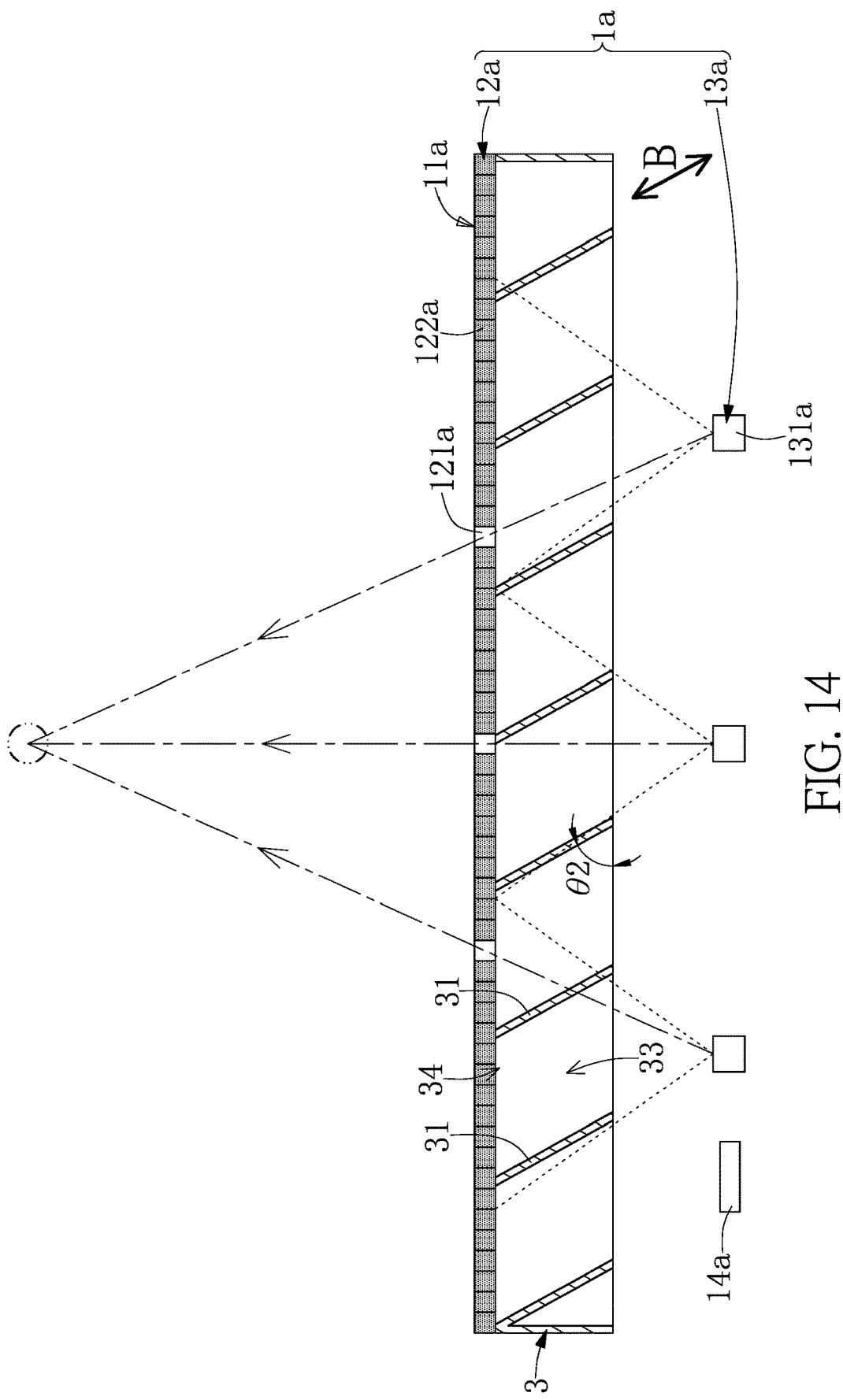
FIG. 14 is a schematic front view of an integrated stereoscopic image display device according to a ninth embodiment of the present disclosure.

Referring to FIG. 14, the structure of this embodiment is substantially the same as that of the above-mentioned eighth embodiment. The difference is that, in this embodiment, the distance between two adjacent ones of the baffles 31 is equal to the distance between two adjacent ones of the pixels 121a that are to be used. The baffles 31 can provide a shading effect to eliminate other levels of light, so as to have a better three-dimensional image display effect.

Figure 15:
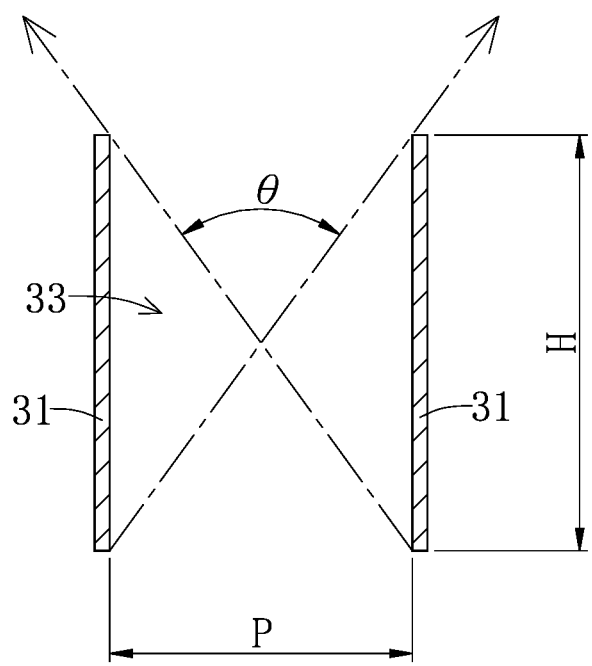
FIG. 15 is a schematic planar view of baffles and a divergence angle of the present disclosure.

In addition, referring to FIG. 15, the distance between two adjacent ones of the baffles 31 can be defined as P, the height of these of the baffles 31 can be defined as H, and the divergence angle of light passing through the light-transmitting portion 33 can be defined as θ, which satisfies the following calculation formula of: $\theta=2\times\tan^{-1}(P/H)$. Therefore, when the divergence angle is fixed, the smaller the distance P (the denser the baffles are) is, the smaller the height H (the lower the height of the baffles) becomes, which can effectively reduce a thickness of the integrated stereoscopic image display device. The baffles in the above-mentioned embodiments also meet the conditions as mentioned in this embodiment.

Figure 16:
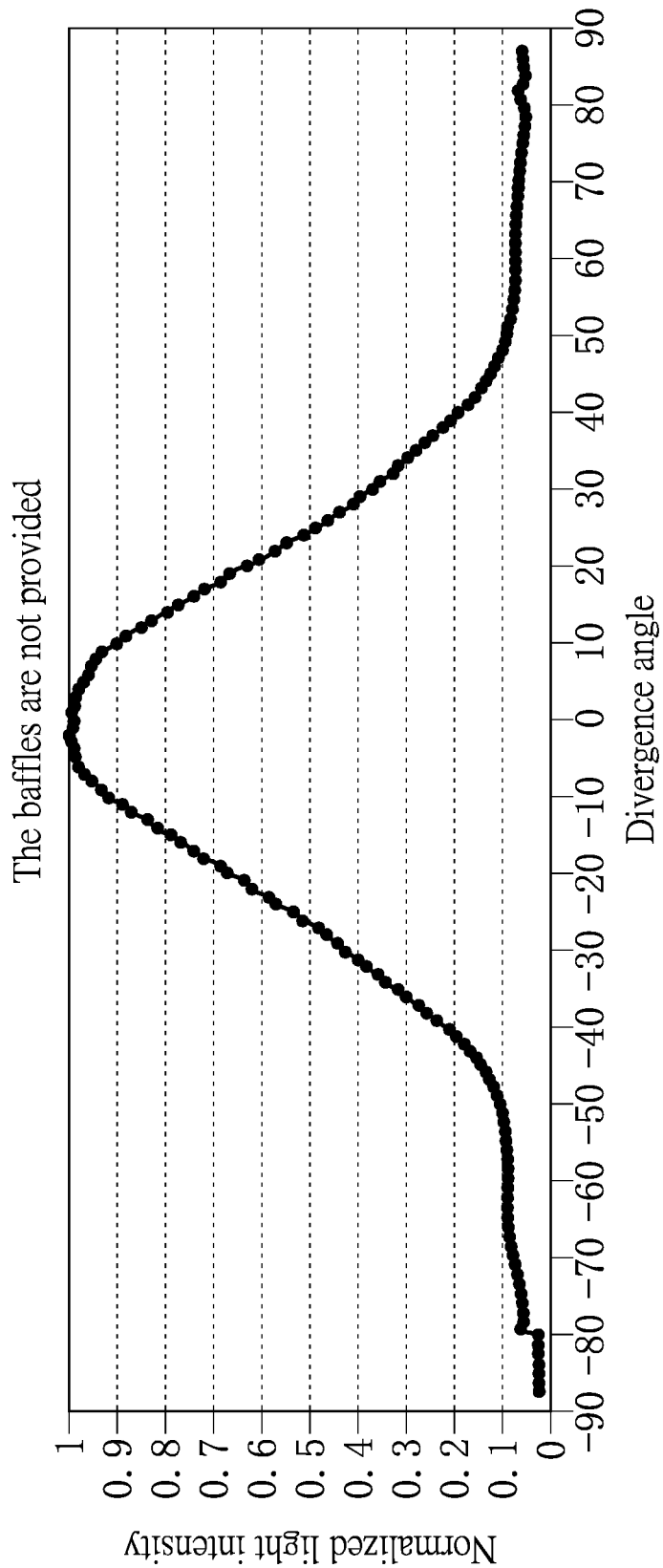
FIG. 16 is a graph showing a relationship between a normalized light intensity and the divergence angle when the baffles are not provided in the present disclosure.
Figure 17:
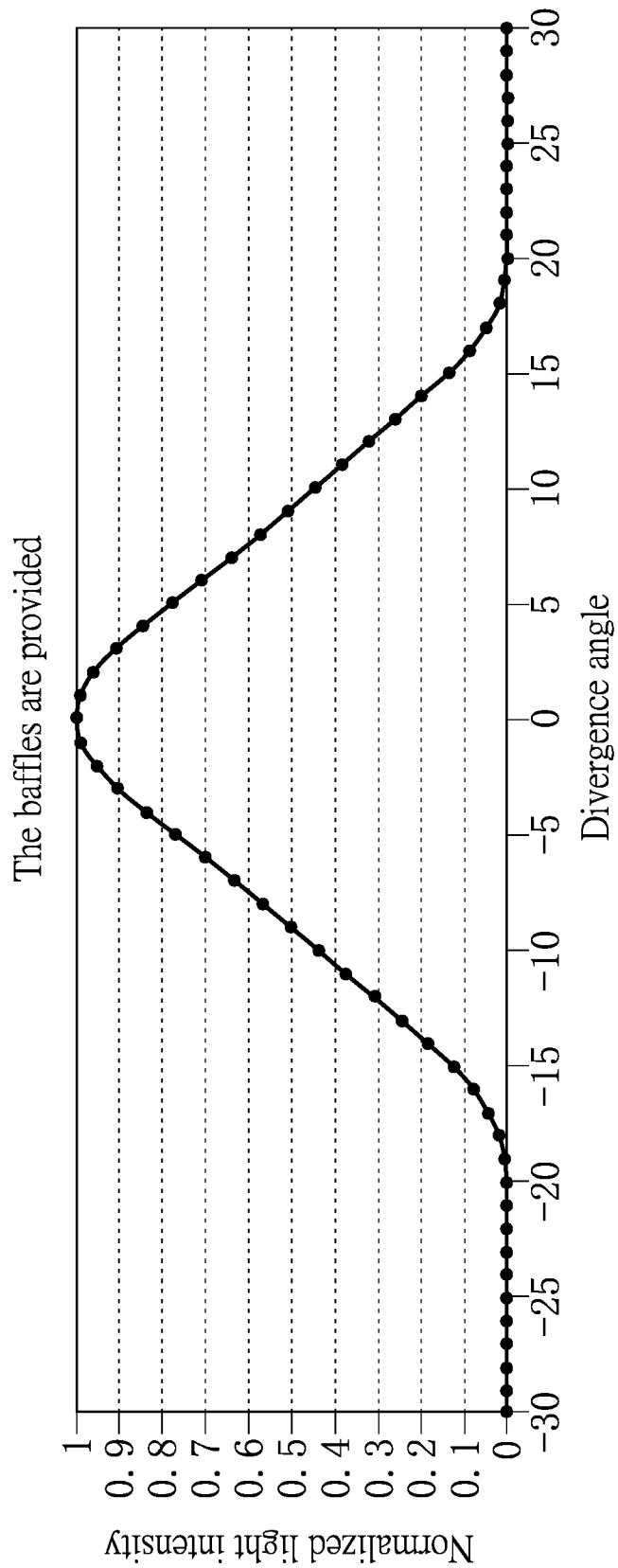
FIG. 17 is a graph showing a relationship between the normalized light intensity and the divergence angle when the baffles are provided in the present disclosure.

In addition, reference is made to FIG. 16 and FIG. 17, which are graphs of the relationship between a normalized light intensity and a divergence angle of light when the baffle is not provided and the baffle is provided, respectively, according to the present disclosure. It can be observed that when a baffle is provided in the present disclosure, a divergence angle of the light generated by the display can be effectively limited.

Beneficial Effects of the Embodiments

In conclusion, in the integrated stereoscopic image display device provided by the present disclosure, an effect of a floating display can be provided, so that viewers are able to view stereoscopic images at an oblique angle. Further, by virtue of the baffle layer including the plurality of baffles, and the baffles having the inclination angle and the rotation angle, an effect of shading can be provided, and a problem that the light distribution of the light source of the display having a large divergence angle and causing the viewer to see other levels of light when moving can be addressed, thereby improving an image quality. Furthermore, a divergence angle of the light generated by the display can be limited, so as to eliminate other levels of light, thereby resulting in a better stereoscopic image display effect. In addition, the baffles are provided in a single layer, which has a simple structure, is easy to manufacture, and has a thin thickness, so that the occupied space can be decreased. The one-layer structure of the present disclosure can increase the transmittance of outgoing light and reduce the probability of generating a moiré pattern.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An integrated stereoscopic image display device, comprising:
   a display having a display surface that defines a planar direction and an image computing unit;
   a lens array layer disposed adjacent to the display surface of the display, wherein the lens array layer includes a plurality of lenses; and
   a baffle layer including a plurality of baffle stripes arranged within a baffle frame, wherein the baffle stripes are arranged parallel to one another at intervals,
   wherein each of the baffle stripes extends in a slanting direction with respect to the baffle frame at an acute first inclined angle of less than 90 degrees when viewed in the planar direction;
   wherein each of the baffle stripes is inclined toward the display surface at an acute second inclined angle of less than 80 degrees when viewed in a cross sectional direct perpendicular to the planar direction;
   wherein the second inclined angle of baffle stripes does not render the baffle stripes fully blocking light passage in the planar direction;
   wherein a hollow translucent part is formed between two adjacent ones of the baffle stripes, and an opening is formed at one end of the translucent part away from the display, such that the baffle stripes provide a shading effect to limit a divergence angle of a light generated by the display, and wherein an unreconstructed image displayed on the display surface is recombined through the lens array layer to form an integrated image, so as to form a three-dimensional image.

2. The integrated stereoscopic image display device according to claim 1, wherein a distance between two adjacent ones of the baffle stripes is smaller than or equal to an outer diameter of one of the lenses.

3. The integrated stereoscopic image display device according to claim 1, wherein a distance between two adjacent ones of the baffle stripes is smaller than 500 μm.

4. The integrated stereoscopic image display device according to claim 1, wherein the second included angle is from 10 degrees to 80 degrees.

\* \* \* \* \*